Figure 1:
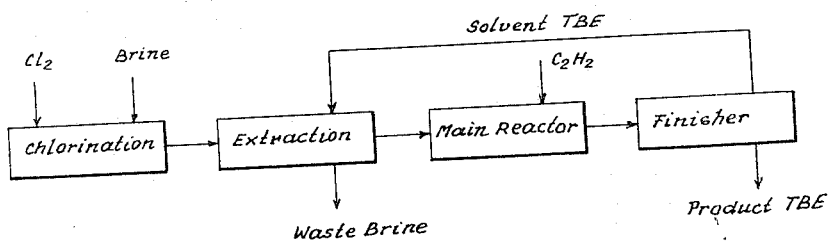

3,291,710
Patented Dec. 13, 1966

3,291,710
PROCESS FOR THE MANUFACTURE OF TETRABROMOETHANE
Avraham Baniel and Avraham Beer, Haifa, Leonard Marshall Shorr, Beersheba, and Endre Varshanyi, Haifa, Israel, assignors, by mesne assignments, to Israel Mining Industries-Institute for Research and Development, Haifa, Haifa Bay, near Ir. Ganim, a company of Israel
Filed July 22, 1963, Ser. No. 296,677
Claims priority, application Israel, Sept. 12, 1962, 17,924
4 Claims. (Cl. 204—163)

This invention relates to the manufacture of tetrabromoethane by the reaction of acetylene with elementary bromine.

It has already been proposed to prepare tetrabromoethane by the photo-catalyzed reaction of acetylene and bromine. According to a particular embodiment of that process, the synthesis of tetrabromoethane can be combined with the extraction of bromine from a chlorinated aqueous bromide brine by means of tetrabromoethane, in which process the tetrabromoethane-bromine extract is separated from the brine, acetylene is introduced into the extract in substantially the stoichiometrically required amount, and the liquid reaction system containing bromine, acetylene and tetrabromoethane is subjected to conditions of illumination at least during the last stage of the reaction, beginning when the greater part of the elementary bromine in the extract has reacted with acetylene.

The present invention relates to a combined process of extracting elementary bromine from a chlorinated aqueous bromide brine by means of tetrabromoethane and reacting the extracted bromine with acetylene in the extract. The reaction between acetylene and bromine can be represented as proceeding in two stages as follows:

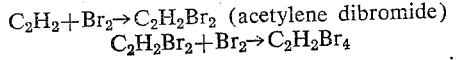

$$C_2H_2 + Br_2 \rightarrow C_2H_2Br_2 \text{ (acetylene dibromide)}$$
$$C_2H_2Br_2 + Br_2 \rightarrow C_2H_2Br_4$$

The first of these reactions is much more rapid and requires less photo-energy for its promotion than the second one and the entire acetylene required for the process is, therefore, consumed before the bromine is completely converted.

If the reaction is performed under the conditions of the earlier process aforesaid, it appears to be based on a free-radical chain mechanism which is very sensitive to interruptions. Thus, for example, the process is sensitive to an imbalance in the reagent streams which are controlled to produce tetrabromoethane essentially free of both acetylene dibromide and bromine. It would be possible, of course, to operate with an excess of either acetylene or bromine and to remove residual acetylene dibromide or bromine from the finished product. However, this would complicate the process and increase the cost of production. Furthermore, if tetrabromoethane containing bromine were recycled as extracting solvent to the extraction stage, the efficiency of the extraction would be impaired.

The invention is based on the new observation that if a relatively high level of acetylene dibromide is maintained in the solvent stream, the reaction is not so highly sensitive to interruption of the free-radical process and to slowing-down of the reaction in the reagent stream, and the reaction rate is increased.

Based on this observation the invention consists in a combined process, wherein bromine is extracted from a chlorinated aqueous brine with tetrabromoethane containing a proportion of acetylene dibromide so calculated that the bromine content of the extract is substantially equivalent stoichiometrically to the acetylene dibromide content of the extract; the extract is separated from the brine, a minor proportion thereof is withdrawn from circulation and subjected to a finishing treatment by intensive illumination for the conversion of essentially all the acetylene dibromide into tetrabromoethane by reaction with the bromine contained in the extract, and the major proportion of the extract is regenerated by the addition of more acetylene and recycled to the brine.

The bromine contained in the main portion of the circulating extract reacts with the freshly added acetylene and forms mainly acetylene dibromide though the formation of a small proportion of tetrabromoethane is not impossible. This regenerating treatment of the circulating portion of the extract is preferably also photo-catalyzed though the illumination may be far less intensive than it has to be for the finishing treatment of the portion of extract withdrawn from circulation.

It was to be expected that any acetylene dibromide present in the solvent tetrabromoethane would react in the extraction stage not only with the bromine being extracted into the solvent phase, but also with the highly concentrated chloride ion in the brine, thereby contaminating the product, for it is known that when ethylene is shaken with bromine and sodium chloride, 1-chloro-2-bromoethane is produced. It was therefore surprising to find that in the process according to the invention the acetylene dibromide in the mixture of acetylene dibromide and tetrabromoethane contacted with the chlorinated brine does virtually not react with the chloride ions of that brine, and that consequently the product tetrabromoethane is substantially free of chlorinated products.

A preferred level of acetylene dibromide in the solvent stream being introduced into the aqueous brine is of the order of 2–3% by weight. Optimally, the proportion of extract withdrawn from the circulation and subjected to the finishing treatment is of the order of 3–4% of the total amount of extract separated from the brine.

The rate of reagent flow should be adjusted in such a manner that the relative proportions of the reactants—acetylene dibromide Br$_2$ after the extraction and C$_2$H$_2$/Br$_2$ prior to the extraction—correspond substantially to the stoichiometrical ratios. At the same time the take-off of the portion of extract withdrawn from circulation is preferably so conducted that this portion contains about 2% each of acetylene dibromide and bromine, the amount of acetylene dibromide being slightly greater than that of the bromine corresponding to their molecular relationship of 186:160.

The accompanying drawing shows two flow sheets:
FIG. 1 representing the earlier process referred to above, and
FIG. 2 the process according to the present invention.

By way of example it is assumed that in both cases a chlorinated aqueous bromide brine containing an average of 10 g./liter of bromine was extracted with tetrabromoethane in a solvent-brine ratio of 1:10 in a plant designed for a tetrabromoethane production capacity of 50 kg. per hour.

Figure 2:
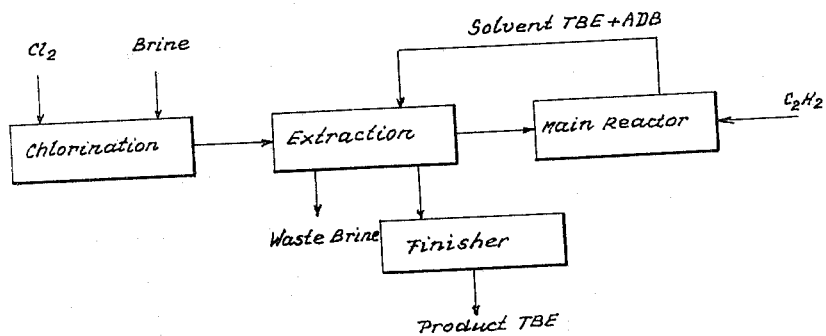

Comparison between the two processes under otherwise equal conditions shows the following:

(1) The level of acetylene dibromide in the solvent tetrabromoethane used for the extraction was below 0.5% in the case of FIG. 1 and 3.3% in the case of FIG. 2. Thereby the rate of production of tetrabromoethane was increased from 25 kg./hour to 35 kg./hour. Momentary changes in the acetylene flow rate by as little as a few percent at times reduced the production rate to below 20 kg./hour in the case of FIG. 1. No such effect was observed in the case of FIG. 2.

(2) To reduce the level of acetylene dibromide in the tetrabromoethane extract to less than 0.5%/weight at a tetrabromoethane production rate of 28 kg./hour required lamps producing a total of 1440 watt at the finisher of FIG. 1. In the case of FIG. 2, a total of 80 watt at the finisher was sufficient.

The process according to the invention has considerable advantages as compared with earlier similar processes, of which the following are noteworthy: a less careful adjustment of the relative proportions of the reactants is required for the recycled major part of the tetrabromoethane extract; this, in turn, renders possible a higher rate of circulation of the solvent; less light energy is consumed.

In addition it has been found that if solvent tetrabromoethane containing about 96 g./liter of acetylene dibromide is contacted with ten times its volume of an aqueous brine containing free bromine, e.g. about 9 g./liter, and chloride ion, e.g. about 200 g./liter, and left in contact with the brine until about 60% of the acetylene dibromide has reacted with bromine, and the extract separated from the brine and subjected to the photo-catalyzed finishing treatment, the product contains no detectable traces of chlorine.

The above experiment shows that virtually no reaction occurs between the acetylene dibromide and the chloride ions of the brine. This finding is confirmed by analysis of product samples for their chlorine content as shown by the following Table I. In this table Cases 1–4 are samples taken in the course of an operation in accordance with the invention while cases 5 and 6 are blank tests of products obtained in a conventional process in which the solvent tetrabromoethane was substantially free of acetylene dibromide.

TABLE I

| Case No. | Specific Gravity (17° C.) | Percent Organically Bound Cl |
|---|---|---|
| 1 | 2.959 | 0.16 |
| 2 | 2.954 | 0.20 |
| 3 | 2.950 | 0.28 |
| 4 | 2.955 | 0.21 |
| 5 | 2.952 | 0.26 |
| 6 | 2.955 | 0.23 |

The above results are all the more surprising when considering that the acetylene dibromide does in part react with the free bromine of the brine as shown by the following Table II in which the three columns indicate, respectively, the acetylene dibromide content of the solvent tetrabromoethane, the acetylene dibromide content of the extract and the total free $Br_2$ reacted with acetylene dibromide.

TABLE II

| Case No. | Original acetylene dibromide conc. (g./l.) | Acetylene dibromide conc. in extract (g./l.) | Total free $Br_2$ reacted,[1] percent |
|---|---|---|---|
| 1 | 64.0 | 42.6 | 18 |
| 2 | 112.1 | 96.4 | 13.5 |
| 3 | 135.2 | 113.1 | 19 |
| 4 | 138.1 | 112.1 | 22 |

[1] Based on 100 g./l. $Br_2$ in extract.

The invention is further illustrated by the following example to which it is not limited.

An aqueous brine solution, containing 10 g./l. of bromide ion, is fed to a chlorination vessel at a rate of 2,500 liters per hour, where it is contacted at ambient temperatures with chlorine gas introduced at a rate such that the solution leaving the vessel contains not more than 10 g./l. of free halogen calculated as bromine. This chlorinated brine is contacted countercurrently with solvent tetrabromoethane containing 96 g./l. of acetylene dibromide and flowing at a rate of 250 liters per hour. Three percent of the extract is withdrawn from the extractor at a point where the acetylene dibromide concentration is found to be 73 g./l. and that of bromine is 62 g./l., and is fed to the finisher from which essentially pure tetrabromoethane, containing no free bromine, is withdrawn as product. The brine leaving the extractor is discarded. The major portion of the extract solution, as it leaves the final stage of the extractor, is contacted with acetylene in the main reactor in such proportions that the solvent tetrabromoethane removed therefrom contains 96 g./l. of acetylene dibromide. This material is recycled to the extractor.

What we claim is:

1. A process for the manufacture of tetrabromoethane, wherein bromine is extracted from a chlorinated aqueous bromide brine with tetrabromoethane containing so much acetylene dibromide that the bromine content of the extract is substantially equivalent stoichiometrically to the acetylene dibromide content of the extract; the extract is separated from the brine, a minor proportion thereof is withdrawn from circulation and subjected to a finishing treatment by intensive illumination for the conversion of essentially all the acetylene dibromide to tetrabromoethane by reaction with the bromine contained in the extract, and the major proportion of the extract is regenerated by the addition of more acetylene and recycled to the brine.

2. A process according to claim 1, wherein the level of acetylene dibromide in the solvent stream being introduced into the aqueous brine is of the order of 2–3% by weight.

3. A process according to claim 1, wherein the proportion of extract withdrawn from the circulation and subjected to the finishing treatment is of the order of 3–4% of the total amount of extract separated from the brine.

4. A process according to claim 1, wherein so much extract is withdrawn from circulation the portion thus withdrawn contains about 2% each of acetylene dibromide and bromine.

References Cited by the Examiner

UNITED STATES PATENTS 3,196,099    7/1965    Shorr _____ 204—163

JOHN H. MACK, *Primary Examiner.*

H. S. WILLIAMS, *Assistant Examiner.*